(12) United States Patent
Lv et al.

(10) Patent No.: US 8,255,273 B2
(45) Date of Patent: Aug. 28, 2012

(54) EVALUATING ONLINE MARKETING EFFICIENCY

(75) Inventors: Kaili Lv, Hangzhou (CN); Zheng Zhang, Hangzhou (CN); Bing Yang Hua, Hangzhou (CN); Zengguang Liu, Hangzhou (CN); Jian Deng, Hangzhou (CN); Jie Su, Hangzhou (CN); Chao Feng Meng, Hangzhou (CN); Huai-Bin Yuan, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 12/602,699

(22) PCT Filed: Sep. 28, 2009

(86) PCT No.: PCT/US2009/058566
§ 371 (c)(1),
(2), (4) Date: Dec. 2, 2009

(87) PCT Pub. No.: WO2010/037003
PCT Pub. Date: Apr. 1, 2010

(65) Prior Publication Data
US 2011/0166926 A1 Jul. 7, 2011

(30) Foreign Application Priority Data

Sep. 28, 2008 (CN) .......................... 2008 1 0167102

(51) Int. Cl.
*G06Q 30/00* (2012.01)
(52) U.S. Cl. ..................................................... 705/14.1
(58) Field of Classification Search ................... 705/14.1
See application file for complete search history.

(56) References Cited

U.S. PATENT DOCUMENTS

| | | | |
|---|---|---|---|
| 6,006,197 A | 12/1999 | d'Eon et al. | |
| 6,925,442 B1 * | 8/2005 | Shapira et al. | 705/7.33 |
| 2001/0032126 A1 | 10/2001 | Macartney-Filgate et al. | |
| 2003/0014304 A1 | 1/2003 | Calvert et al. | |
| 2004/0204983 A1 | 10/2004 | Shen et al. | |
| 2004/0225562 A1 | 11/2004 | Turner | |
| 2005/0021396 A1 | 1/2005 | Pearch et al. | |
| 2005/0028188 A1 | 2/2005 | Latona et al. | |
| 2005/0033627 A1 | 2/2005 | Thieme et al. | |
| 2006/0041480 A1 | 2/2006 | Briggs | |
| 2006/0248035 A1 | 11/2006 | Gendler et al. | |
| 2007/0124767 A1 | 5/2007 | Laskowski-Bender et al. | |
| 2007/0271145 A1 | 11/2007 | Vest | |
| 2008/0114642 A1 | 5/2008 | Goldberg et al. | |
| 2008/0133342 A1 | 6/2008 | Criou et al. | |
| 2009/0106058 A1 | 4/2009 | McAfee et al. | |
| 2009/0106070 A1 | 4/2009 | Konar | |

* cited by examiner

*Primary Examiner* — Daniel Lastra
(74) *Attorney, Agent, or Firm* — Lee & Hayes, PLLC

(57) ABSTRACT

A method and a system evaluate a company website's online marketing efficiency on various advertising websites by evaluating both access activities and business activities of users originating from the advertising websites. For each user visiting the company website, the method determines the originating website from which the user enters the company website, and obtains the access activities and the business activities of the user on the company website. The method quantifies the access activities and the business activities of the users who enter the present website from the same originating website to generate evaluation data corresponding to the originating website, and evaluates the company website's online marketing efficiency on the originating website based on the evaluation data of the originating website. Using the disclosed method and system, online marketing efficiency can be evaluated more comprehensively and accurately.

20 Claims, 3 Drawing Sheets

EVALUATING ONLINE MARKETING EFFICIENCY

RELATED APPLICATIONS

This application claims priority from Chinese patent application, Application No. 200810167102.7, filed Sep. 28, 2008, entitled "METHOD AND SYSTEM OF EVALUATING ONLINE MARKETING EFFICIENCY".

BACKGROUND

The present disclosure relates to network management technologies in communication field, and particularly relates to methods and systems of evaluating online marketing efficiency.

Today, an increasing number of companies conduct online marketing through various kinds of search engines or advertisement platforms. How to comprehensively and accurately determine whether an online marketing method of a selected search engine or advertisement platform is effective and select a better advertisement venue for online marketing has therefore become an important issue for the advertising companies.

In existing technologies, a system for monitoring website users is set up on a company website. Codes are embedded within a web page of the company website to obtain behavior information related to access operations of a user. For example, the information may include the user's originating website (which may be the website just visited by the user prior to entering the company website), an originating IP address (from which the location of the user can be analyzed), the time at which the user browses the web page, the number of web pages being browsed, an access path (e.g., a sequence of web pages browsed by the user), the number of visits, and the number of web pages being browsed in each access. This behavior information of access operations is then analyzed to determine how likely the user is a potential customer, or how valuable a visit by the user is. Access volume brought about by the originating website is evaluated to determine how many potential customers come from there, from which online marketing efficiency of the originating website can be evaluated. A company may use the above method to evaluate the originating websites to determine which originating website's online marketing is effective and which is not. This helps the company select a more effective investment for subsequent online marketing and promotion, and avoids ineffective marketing involvement.

Existing technologies determines how likely a user is a potential customer based on behavior information related to access operations of the user. Although online marketing efficiency may be analyzed to some extent, the evaluation of online marketing conducted using this approach lacks comprehensiveness and accuracy because the evaluation is based only on access operations of the user. For instance, while it may be valuable to know the staying times at web pages and the number of visits of the user in determining whether the user is a potential customer, in reality the user may stay on a website for reasons other than having an interest in the contents of the website. As such, certain discrepancies may exist between the analysis result and the gravity, leading to an inaccurate evaluation of online marketing efficiency.

SUMMARY OF THE DISCLOSURE

The present disclosure provides a method and a system for evaluating a company website's online marketing efficiency on various advertising websites by evaluating both access activities and business activities of users originating from the advertising websites.

In one aspect, a method of evaluating online marketing efficiency determines originating websites from which users enter a present website, and obtains access activities and business activities of the users on the present website. The method then quantifies the access activities and the business activities of the users who enter the present website from the same originating website to generate evaluation data corresponding to the originating website. The method then evaluates the present website's online marketing efficiencies on each of the originating websites based on the respective evaluation data. Using the disclosed method, an originating website used for advertising a company website (the present website) may be quantitatively evaluated by giving consideration to not only the access activities but also the business activities of the users.

In another aspect, a system of evaluating online marketing efficiency includes various modules to realize the functions of the method. A determination module is used for determining originating websites from which users enters a present website. An acquisition module is used for obtaining access activities and business activities of the users on the present website. A computation module is used for quantifying the access activities and the business activities of the users to generate the evaluation data corresponding to the users and the originating websites. An evaluation module is used for evaluating the present website's online marketing efficiencies on the originating websites based on respective evaluation data of the originating websites.

The present disclosure quantifies both the access activities and the business activities of a user on a present website to generate evaluation data that corresponds to the user's originating website, and evaluates the present website's online marketing efficiencies on various originating websites based on the respective evaluation data. The access activities and the business activities of users are combined for evaluating the marketing efficiency, resulting in a more comprehensive and accurate evaluation result. Furthermore, different quantifying schemes (e.g., scoring schemes) may be set up for different access activities and different business activities to allow more accurate evaluation results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

The exemplary embodiments of the present disclosure are described in details using accompanying figures.

For the purpose of illustration, one exemplary embodiment uses an example in which a certain company website uses online marketing services (e.g., website search service, advertising service, etc) of various websites (referred to as "marketing websites" hereinafter). An exemplary process of evaluating online marketing efficiencies of the company website on these marketing websites is illustrated.

Figure 1:
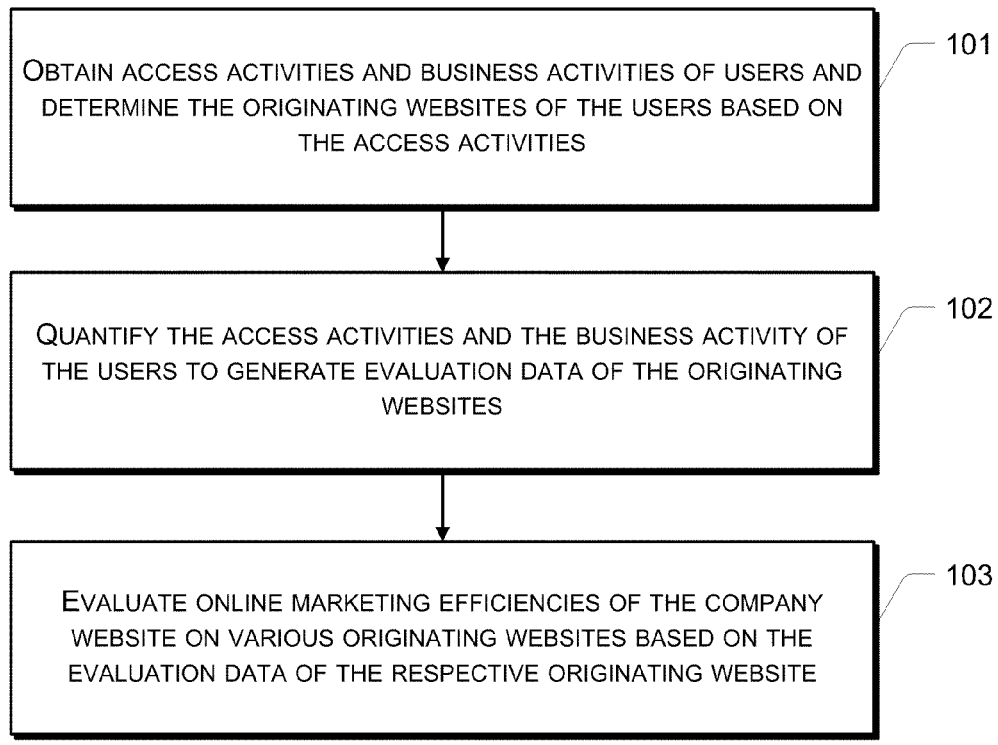
FIG. 1 shows a flow chart of an exemplary process of evaluating online marketing efficiency in accordance with the present disclosure.

FIG. 1 shows a flow chart of an exemplary process of evaluating online marketing efficiency in accordance with the present disclosure. In this description, the order in which a process is described is not intended to be construed as a limitation, and any number of the described process blocks may be combined in any order to implement the method, or an alternate method. As shown in FIG. 1, as users conduct business operations on the company website, the online marketing efficiency is evaluated using a process including the following procedures.

At Block 101, an evaluation system obtains business activities and access activities of the user. The evaluation system also determines an originating website from which the user enters the company website based the access activities. For example, the evaluation system determines the originating website by finding from which the marketing website the user has entered into the company website. Evaluation system may be part of the company website, or a stand-alone system in communication with the company website.

It is appreciated that any suitable technical approach may be used to determine an originating website from which the user enters the company website based on the access activity of the user.

For at least some of the users, the evaluation system determines at least one access activity and at least one business activity. In other words, the evaluation system gives consideration to not only the access behavior of the user but also the business behavior of the user in order to more comprehensively and more accurately evaluate the commercial value of a visit by the user.

At Block 102, the evaluation system quantifies the business activities and the access activities of the users who visited the company website from the originating websites, and generates evaluation data based on the quantified access activities and the business activities of the users. This may be done for all users who have visited the company website, or just certain selected users. The quantification may be either done non-discriminatorily for all individual users or done group by group. For example, users who have entered the present website (the company website) from the same originating website may be treated as a group and their access activities and the business activities may be quantified together. Even if the quantification is done non-discriminatorily for all individual uses without grouping, the results of the quantification may be subsequently grouped for evaluation purposes.

At Block 103, the evaluation system evaluates online marketing efficiencies of the company website on various originating websites based on the evaluation data generated from the access activities and business activities of the users who have arrived at the company website from the respective originating website.

In the above process, the business activity involves of business operation which may be conducted by the user at or through the company website. Such business operations may include operations such as submitting an order, submitting user information, and communicating using a communication tool provided by the company website. The operation of submitting an order by the user generates an order record in an order processing system of the company website. The order record generally includes information such as the owner of the order, the time when the order was generated, the product or service purchased, and the cost. The company website may further provide capabilities for the user to fill in and submit information. One way to do this is by adding codes programmed for the needed capabilities on the company website. Examples of submitting information by the user include filling in and submitting contact information of the user (e.g., a telephone number and an email address), a user comment and a user feedback. Such an operation generates a user information record in a relational database of the company website. The company website may further provide to the user a communication tool to interact with personnel of the company website such as an owner or a staff of the website. For example, the user may communicate with the personnel of the company website using a WebIM (Web Instant Messaging) tool provided.

At the above Block 101, the business activities and the access activities of a user may be obtained using any suitable technical method. For example, the business activities of a user may be obtained by checking the user's behavior records of business operations in various systems using an ID number or other unique identifier of the user. For instance, the evaluation system may inquire the order processing system of the company website about whether the user has any order records, and inquire a communication system about whether the user has any records of using the WebIM tool to communicate with a personnel of the company website, or whether the user has left any contact information or feedback/opinion. The business activities of the user may further be obtained through feedback information of various systems on or through which the user conducts business. For example, if the user has had a business operation in a system, the system may send out information indicating the business operations of the user. The information is used to determine what business operation has been conducted by the user using, for example, an event mechanism.

The above process of obtaining the business activity of the user acquires behavior information related to business operations of the user. The behavior information related to business operations of the user may then become a basis for subsequent evaluation of online marketing efficiency, resulting in a more comprehensive and accurate evaluation result.

At Block 102 of the above process, the access activities and the business activities of the users on the company website are quantified to generate the evaluation data using a quantification algorithm or scheme. A different qualification scheme may be used for different types of activities. The evaluation data may be a score, a classification or other quantified data that can be used for evaluation. In case where the evaluation data is a score, for example, the quantification algorithm may set up different score values for different types of business operations (including the above mentioned operations of submitting an order, submitting user information and conducting instant communication), and different score values for different access activities (e.g., the stay time on the company website, the number of clicks made on the company website, the number of web pages browsed, and the order of which the web pages are browsed).

A correspondence table or lookup table containing correspondences between the activities and associated scores may be established in advance. As these activities of the user are obtained, values corresponding to the access activity and the business activity of the user on the company website may be determined according to the correspondence table. Specifically, the access activity and the business activity of the user who arrives at the company website from an originating website are quantified to generate scores which become a part of the evaluation data corresponding to the originating website.

In general, a user who places an order is of a higher value to the company website than a user who merely submits user information, and a user who stays on the company website for a longer period of time is of a higher value to the company website than a user who stays for a short period of time. Taking these preferences into consideration, the score for submitting an order is higher than the score for submitting user information, while the score for staying in the website for a long period of time is higher than the score for staying in the website for a short period of time. As such, different access activities and different business activities are assigned with different scores.

Users who arrive at the company website from various originating websites are evaluated based on a scheme described above. Accordingly, online marketing efficiencies of the various originating websites are evaluated at the end. For example, each originating website may be given an overall score, with a higher score corresponding to a better marketing efficiency.

As described above, the access activities and business activities are combined together for evaluation of marketing efficiency to provide a more comprehensive evaluation result. Furthermore, different evaluation scores may be set up and assigned to different access activities and different business activities to allow an even more accurate evaluation result.

In the above process of quantifying evaluation data, the quantification algorithm may not only set up different scores for different types of business activities, but may also set up different scores for specific operations under a same type of business activities. This is illustrated using an operation of submitting an order as an example. If a transaction amount of a user exceeds a preset threshold, the score associated with the user may be increased accordingly as a result of this event or activity. Multiple thresholds may be set up to allow different ranges of transaction amounts corresponding to different scores. In this example, upon obtaining the user's activity of submitting an order on the company website, information such as a transaction amount may also be obtained from an order processing system of the company website.

The activity of making instant communication is another example for illustration. The longer the time spent by a user in communication on the website is, the higher a score the activity earns for the user.

Another example for illustration is the activity of submitting user information. Leaving contact information by a user is deemed to have a higher score than simply leaving a message. The information submitted by a user may be obtained from a relational database of the company website upon obtaining the user's activity of submitting user information on the company website.

Block 103 of the above process is further described using the embodiment described as follows. The online marketing efficiency of an originating website is evaluated using the evaluation data generated from the access activities and business activities of users who arrive at the company website from the same originating website. The marketing efficiencies of various originating websites are evaluated based on the evaluation results corresponding to the respective originating website. For example, evaluation scores of various users reaching the company website from the same originating website are first computed. An overall result may be taken as the score of that originating website. Scores of various originating websites may be compared with each other in order to evaluate the online marketing efficiencies of the various originating websites. In general, a higher score may be given to indicate better online marketing efficiency of an originating website.

In one embodiment of computing evaluation scores, the evaluation scores of users who arrive at the company website from the same originating website are summed up. The scores of individual uses may be weighted before being summed up. The weights may be configured according to experience. An average is obtained from the sum based on the number of the users arriving at the company website from the same originating website. The average can be an arithmetic average or a geometric average. An average value obtained this way is used as the final score for that originating website. Alternatively, the sum (weighted or non-weighted) of the evaluation scores of the users reaching the company website from that same originating website is used as the final score for the originating website.

In the above process, the online marketing efficiency of an originating website can be comprehensively evaluated based on the evaluation data of all or a portion of users from this same originating website. The portion of users used for evaluation may be users having evaluation score at or above a predetermined threshold, or users have placed more orders than a threshold, or users who have had a transaction amount greater than a threshold, as recorded in the order processing system.

It is noted that the original website may be the same as the present website (the company website). In the exemplary embodiments of the present disclosure, if a user enters the company website by directly inputting an address of the company website into an address field of a browser, the company website itself is deemed as the originating website. In this situation, the access activity and the business activity of the user during the visit on the company website are quantified and evaluated to obtain an online marketing efficiency associated with this type of a situation. Combining the online marketing efficiency associated with this situation with the online marketing efficiencies of various other originating websites provides a further basis for the company to decide an online marketing strategy.

In one embodiment, the access activity and the business activity of a user entering the company website from an originating website is quantified to generate evaluation data in real time using Blocks 101, 102 and 103 of the above process as the user conducts a business operation on the company website. Furthermore, the online marketing efficiencies of various originating websites is comprehensively evaluated in real time using the evaluation data of various users entering the company website from the various originating websites. As an alternative, when a user conducts a business operation on the company website, Blocks 101 and 102 of the above process are carried out first on an ongoing basis, while Block 103 is carried out only when the company needs to evaluate the online marketing efficiencies of the originating website. Alternatively, when a user conducts a business operation on the company website, Block 101 of the above process is carried out on an ongoing basis. Behavior information related to the access activities and business activities of the user is recorded. After the user ends the visit on the company website, Block 102 is carried out to quantify the access activity and the business activity of the user and generate the evaluation data based on the information recorded. The online marketing efficiencies of various originating websites are then obtained by carrying out Block 103.

In the exemplary embodiments, even if no behavior information related to business activities of the user is obtained at Block 101 during the entire process described above or during the entire process starting from the time of the user's visiting the company website to the time of the user's ending the visit on the company website, Block 102 may still quantify the obtained access activities of the user to generate evaluation data of the associated originating website. Online marketing efficiencies of the company website on various originating websites are then obtained by carrying out Block 103. However, for a comprehensive evaluation, it is expected that at least some users have business activities are quantified and evaluated.

Figure 2:
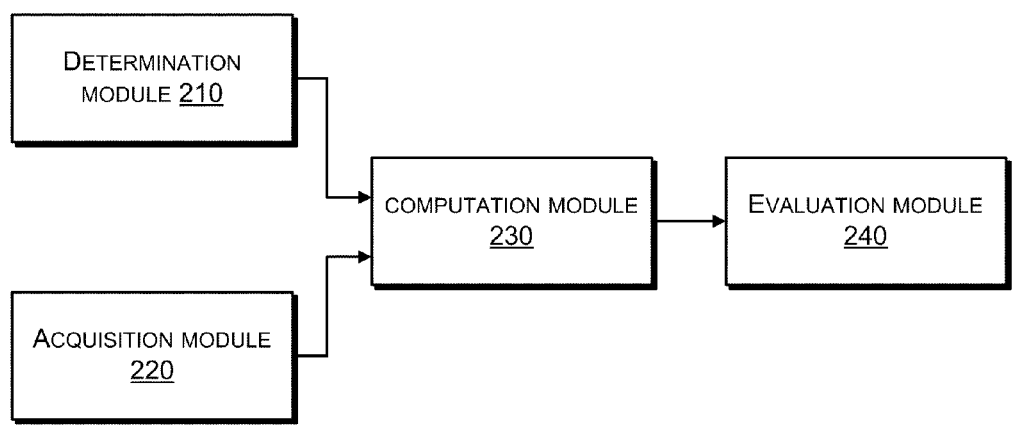
FIG. 2 shows a structural diagram of an exemplary system of evaluating online marketing efficiency in accordance with the present disclosure.

Based on the same technical concept, the present disclosure also provides a system of evaluating online marketing efficiency as shown in FIG. 2. The system includes the several modules to perform various functions as described below.

A determination module 210 is used for determining the originating website from which a user enters a present website. An acquisition module 220 is used for obtaining access activities and business activities of the user on the present website. A computation module 230 is used for quantifying the access activities and the business activities of the user to generate the evaluation data corresponding to the originating websites. In quantifying the user activities, the computation module 230 may quantify a business operation based on the type of this business operation to generate evaluation data corresponding to the business operation type. The types of business operations may include the activities such as placing an order, submitting information, and communicating on the present website using a communication tool provided by the website. Based on the number of clicks the user makes on the present website, the duration of browsing, the number of web pages browsed by the user and the order of which they web pages are browsed by the user, the computation module may 230 further quantify the respective access activities into relevant evaluation data.

An evaluation module 240 is used for evaluating the present website's online marketing efficiencies on the originating websites based on the evaluation data generated from the activities of the users who enter the present website through the respective originating website. The evaluation module 240 may evaluate the present website's online marketing efficiencies on each originating website based on the evaluation data generated from all users who enter the present website through the originating website within a certain period of time or just those users whose activities meet a certain threshold. If evaluation data generated from each user is a score, the evaluation module 240 may obtain an average score of the users and then use the average score as the score of the respective originating website. The present website's online marketing efficiencies on various originating websites are then evaluated based on the respective average scores of the originating websites.

Figure 3:
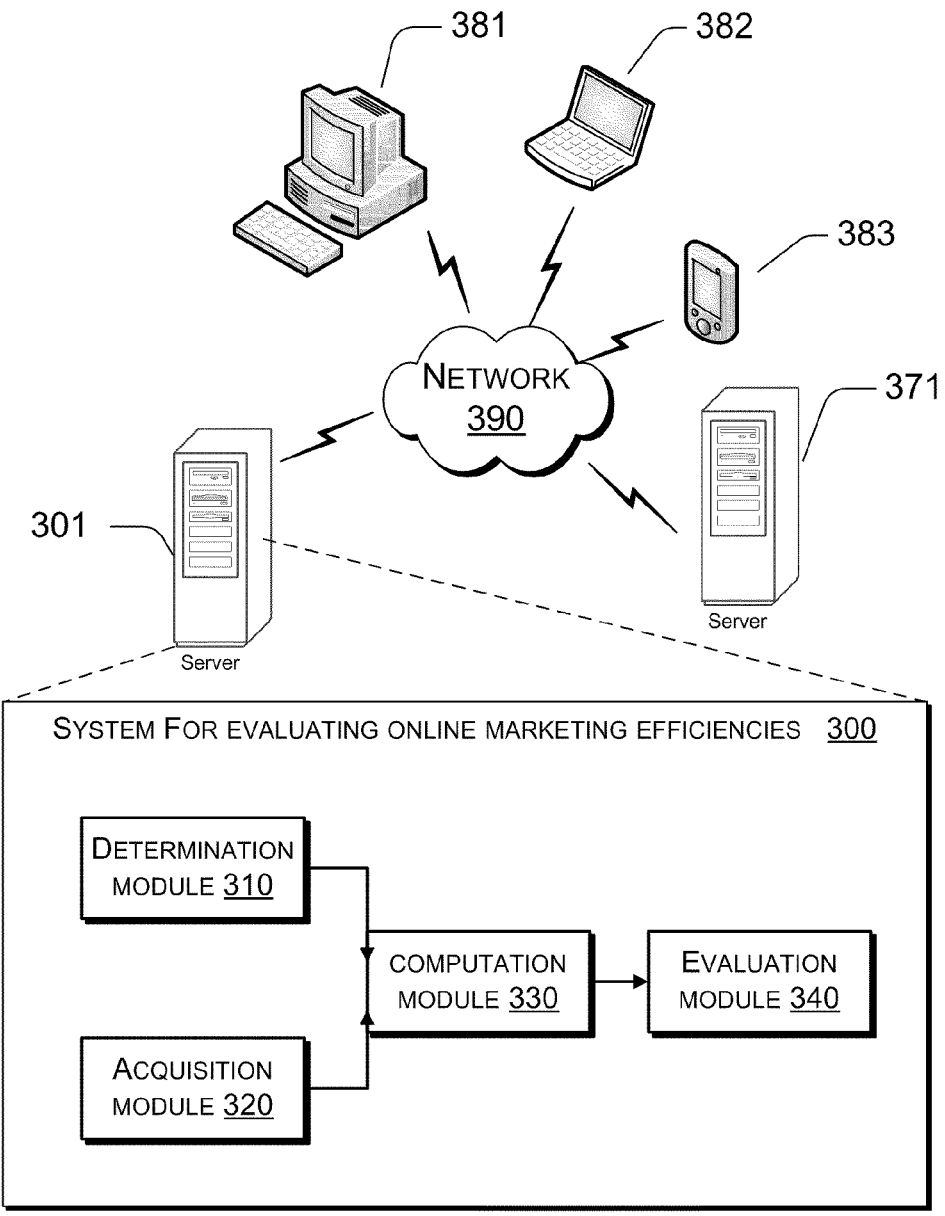
FIG. 3 shows a diagram illustrating an exemplary system and an implementation environment for evaluating online marketing efficiency.

FIG. 3 shows a schematic structural diagram of an exemplary system for evaluating online marketing efficiencies in an exemplary environment. System 300 for evaluating online marketing efficiencies is placed in exemplary network environment for implementing the method of the present disclosure. In one embodiment, the system 300 for evaluating online marketing efficiencies is implemented in a computer system 301. For the purpose of illustration, the computer system 301 also hosts the company website which is being marketed on other websites (originating websites) which are hosted by other servers such as server 371. The computer system 301 may include one or more servers, or a cluster of servers. The evaluation system 300 may either be a part of the company website or be a separate system attached the company website to work in collaboration.

Both the computer system 301 and other servers 371 are connected to client-side computing devices (client terminals) such as 381, 382 and 383 through network(s) 390, such that users (not shown) may access the company website hosted on the computer system 301 either directly or through the originating websites hosted on the other servers such as server 371.

The computing system 301 may include common computer components such as processor(s), I/O devices, computer readable media, and network interface. (not shown). It is also appreciated that a computing system or device may be any device that has a processor, an I/O device and a memory (either an internal memory or an external memory), and is not limited to a personal computer. The computer readable media stores application program modules and data. Application program modules contain instructions which, when executed by processor(s), cause the processor(s) to perform actions of a process described herein. For example, the computer system 301 may be programmed to have a determination module 310, an acquisition module 320, a computation module 320 and an evaluation module 340 to perform similar functions as shown in FIG. 2.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

As illustrated in the exemplary embodiments, the evaluation system of the company website determines an originating website from which a visiting user enters the company website based on the access activities of the user, and obtains the business activities of the user conducted on the company website. The evaluation system quantifies the access activity and the business activity of the users accessing the company website via the same originating website to generate evaluation data corresponding to the originating website. The company website then evaluates the company website's online marketing efficiencies on various originating websites based on the evaluation data generated from the access and business activities of various users who have arrived at the company website from the respective originating website. Using this method, the company website may evaluate multiple originating websites it has selected for online marketing to determine which originating website is more effective in the online marketing of the company website. Such evaluation enables the company to optimize its selections of advertising websites for online marketing. For example, the company may choose to invest more in the more effective originating websites for advertisements in the subsequent online marketing and invest less in websites that are less effective.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of evaluating online marketing efficiency, the method comprising:

for each user visiting a present website, determining an originating website from which the user enters the present website, and obtaining at least one access activity and at least one business activity of the user on the present website;

establishing two-way communications sessions between personnel of the present website and a plurality of users who enter the present website from the same originating website, and for each of the plurality of users, determining a duration for the corresponding two-way communications session;

quantifying the obtained access activities and the business activities of the plurality of users who enter the present website from the same originating website based at least on the durations to generate evaluation data corresponding to the originating website; and evaluating the present website's online marketing efficiency on the originating website based on the evaluation data of the originating website.

2. The method as recited in claim 1, wherein obtaining the at least one business activity of the user comprises:

determining the at least one business activity of the user by checking records of business operations of the user kept at the present website.

3. The method as recited in claim 1, wherein obtaining the at least one business activity of the user comprises:

determining the at least one business activity of the users based on information of business operations of the users sent by a business system related to the present website as the user conducts the business operations.

4. The method as recited in claim 1, wherein quantifying the obtained business activities of the users to generate evaluation data comprises:

classifying the business activities of the users into a plurality of business operation types;

quantifying the business activities of each type according to a quantifying scheme configured for the respective business operation type.

5. The method as recited in claim 4, wherein the plurality of business operation types comprise at least one of placing an order, submitting information, and communicating on the present website using a communication tool provided by the present website.

6. The method as recited in claim 1, wherein the at least one business activity of the user comprises placing an order, and quantifying the at least one business activity of the user comprises:

determining a value of the activity of placing the order according to a transaction amount associated with the order.

7. The method as recited in claim 1, wherein quantifying the at least one access activity of the user comprises:

determining a value of each access activity of the user according to one or more of statistics including number of clicks on the present website, duration of browsing, number of web pages browsed, and order of which the web pages are browsed.

8. The method as recited in claim 1, wherein the evaluation data used for evaluating the present website's online marketing efficiency on the originating website is contributed by quantified access activities and the business activities of all users who have entered the present website from the same originating website in a given period of time.

9. The method as recited in claim 1, wherein the evaluation data used for evaluating the present website's online marketing efficiency on the originating website is contributed by users whose quantified access activities and the business activities meet a predefined threshold.

10. The method as recited in claim 1, wherein the evaluation data comprises a plurality of scores of the plurality of users, and evaluating the present website's online marketing efficiencies on the originating website comprises:

obtaining an average value by summing up the plurality of scores; and evaluating the present website's online marketing efficiencies on the originating website based on the average value.

11. The method as recited in claim 1, wherein evaluating the present website's online marketing efficiency on the originating website based on the evaluation data of the originating website comprising:

comparing the evaluation data of the originating website with evaluation data of at least another originating website.

12. The method as recited in claim 1, wherein the establishing two-way communications between personnel of the present website and a plurality of users includes providing a two-way communications tool to users of the present website, wherein the two-way communications is established via the provided two-way communications tool.

13. The method as recited in claim 12, further comprising:

for each of the plurality of users, scoring the user of the present website based at least on the corresponding duration of two-way communications.

14. The method as recited in claim 12, wherein the providing a two-way communications tool to users of the present website includes providing a Web Instant Messaging (WebIM) tool, wherein the present website instantly communicates with the multiple users via provided WebIM tools.

15. A system of evaluating online marketing efficiency, the system comprising:

a determination module, used for determining originating websites from which users enter a present website and for two-way communicating between personnel of the present website and users of the present website via a two-way communication tool provided to the users by the present website;

an acquisition module, used for obtaining access activities and business activities of the users on the present website;

a computation module, used for quantifying the access activities and the business activities of the users to generate evaluation data of each originating website, wherein the respective evaluation data includes a duration of two-way communications for each user that participated with a two-way communications session with personnel of the present website; and an evaluation module, used for evaluating the present website's online marketing efficiencies on the originating websites based on the respective evaluation data of each originating website generated by quantifying the access activities and the business activities of the users who enter the present website through the same originating website.

16. The system as recited in claim 15, wherein the business activities of the users are classified into a plurality of business operation types, and the computation module is further used for quantifying the business activities of each type according to a quantifying scheme configured for the respective type.

17. The system as recited in claim 15, wherein, to quantify the access activities of the user, the computation module is adapted for determining a value of each access activity of the user according to one or more of statistics including number of clicks on the present website, duration of browsing, number of web pages browsed, and order of which the web pages are browsed.

18. The system as recited in claim 15, wherein the evaluation data comprises a plurality of scores of the plurality of users, and, to evaluate the present website's online marketing efficiencies on the originating website, the evaluation module is adapted for:
   obtaining an average value by summing up the plurality of scores; and
   evaluating the present website's online marketing efficiencies on the originating website based on the average value.

19. A system of evaluating online marketing efficiency, the system comprising a computer which is programmed for performing acts including:
   for each user visiting a present website, determining an originating website from which the user enters the present website, and obtaining at least one access activity and at least one business activity of the user on the present website;
   establishing two-way communications, via a two-way communications tool, between personnel of the present website and a plurality of users who enter the present website from the same originating website, and determining, for each of the plurality of users, a corresponding duration of two-way communications;
   for each of the plurality of users, scoring the user based at least on the corresponding duration of two-way communications;
   quantifying the obtained access activities and the business activities of the plurality of users based at least on the scores of the plurality users to generate evaluation data corresponding to the originating website; and
   evaluating the present website's online marketing efficiency on the originating website based on the evaluation data of the originating website.

20. The system as recited in claim 19, wherein the acts performed by the computer further include:
   providing the two-way communications tool to users of the present website.

\* \* \* \* \*